April 26, 1938.  S. B. TERRY ET AL  2,115,351
CONTINUOUS GAUGE HEAD
Filed Aug. 3, 1937   2 Sheets-Sheet 1

INVENTOR.
Spencer B. Terry
Raymond S. Fox
BY
ATTORNEY

Patented Apr. 26, 1938

2,115,351

UNITED STATES PATENT OFFICE 2,115,351

CONTINUOUS GAUGE HEAD

Spencer B. Terry, West Hartford, and Raymond S. Fox, Hartford, Conn., assignors to Niles-Bement-Pond Company, Hartford, Conn., a corporation of New Jersey Application August 3, 1937, Serial No. 157,174

7 Claims. (Cl. 33—147)

This invention relates to dimension gauges and more particularly to an improved form of gauging head for an electro-induction type of continuous gauge for determining variations in thickness of strip material as it is being rolled.

An object of the present invention is to provide a gauging head, the gauging members of which may contact with the material being gauged while it is being rapidly passed between rotating gauging members, the electro-magnetic means for determining the separation of the contacting members and the thickness of the material being completely enclosed against the entrance of steam, water, dust or other substances that might adversely affect the precision and operation of the gauge.

Another object of the invention is to support the movable gauging member forming the armature of a magnetic circuit, movement of which determines variations in induced currents, in an improved manner preventing it from becoming strained or otherwise injured in the event that excessive pressure is applied against the work contacting members.

A further object of the invention is to provide means for forcing one of the work contacting members toward the other with a substantially constant but light pressure in all adjustments for which the gauge may be set.

One feature enabling the above objects to be obtained is that the electro-magnetic means associated with the movable contacting member are surrounded by a flexible diaphragm secured to the movable contacting member and also secured at its outer periphery to the gauge head so that the operative parts of the gauge and the electrical parts also are completely enclosed by integral portions of the gauge head and by the diaphragm.

And another feature that is advantageous is that the movable work contacting member is mounted for movement away from the fixed work contacting member a material distance against the pressure of a light spring and is normally retained against its seat by the pressure of this spring.

Another important feature is that manual means are provided for adjusting the gauge for different thicknesses of material by raising and lowering the movable work contacting member, these means also effecting adjustment of the micrometer spindle in the opposite direction within this member so that for all adjustments of the gauge the micrometer spindle will remain properly positioned relative to the armature.

And finally it is an object of the invention to mount the armature and induction coils entirely within the body portion of the gauging head, the armature having one end in contact with the end of the micrometer screw threadedly connected to the member on which the movable work contacting roller is mounted.

With the above and other objects in view, the invention includes the features of construction and operation set forth in the following specification and illustrated in the accompanying drawings.

In the accompanying drawings annexed hereto and forming a part of this specification, we have shown the invention embodied in a continuous gauge for measuring the thickness of strip or sheet material as it is being rapidly passed between rotating work contacting members, but it will be understood that the invention can be otherwise embodied and that the drawings are not to be construed as defining or limiting the scope of the invention, the claims appended to this specification being relied upon for that purpose.

Figure 1:
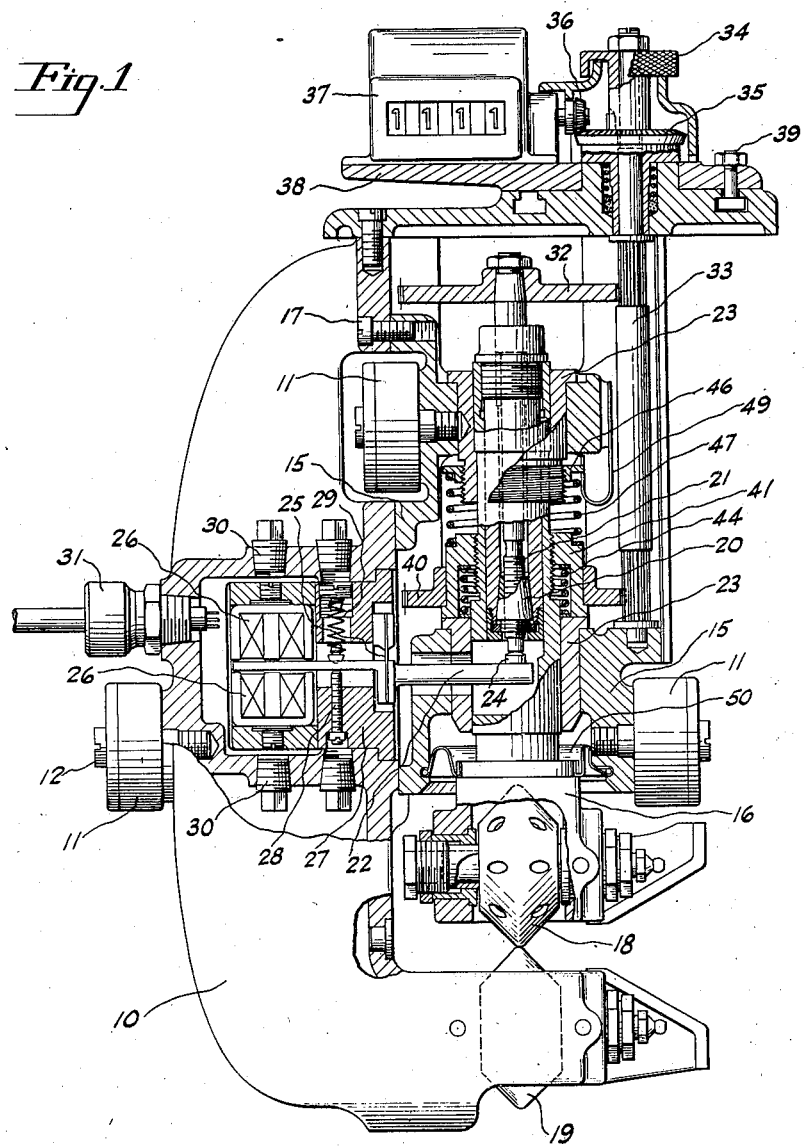
Fig. 1 is a side elevation of a complete gauge head, parts being shown in section to more clearly indicate their construction.
Figure 2:
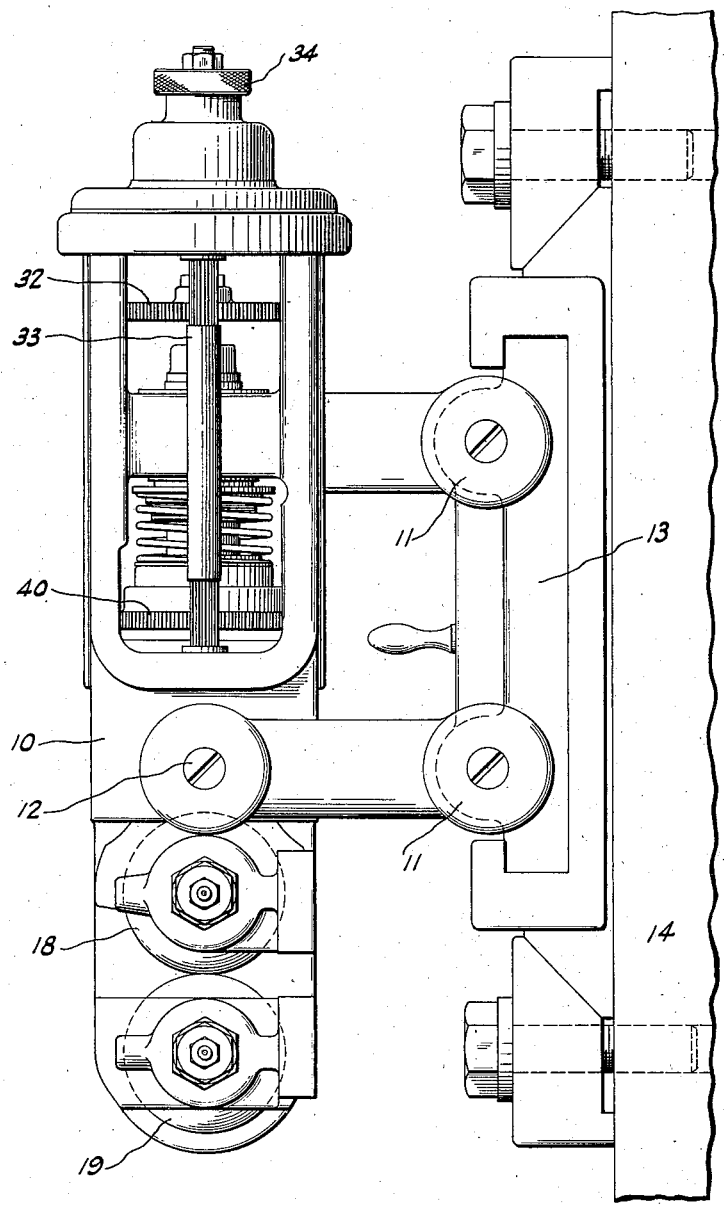
Fig. 2 is a front elevation of the parts shown in Fig. 1 and showing the supporting members for the gauge head permitting free vertical adjustment of the head through a limited arc.

In the above mentioned drawings there has been shown but one embodiment of the invention which is now deemed preferable, but it is to be understood that changes and modifications may be made within the scope of the appended claims without departing from the spirit of the invention.

This application relates to improvements in the form of gauge shown and described in the copending application of Spencer B. Terry, one of the present applicants, Serial No. 93,867, filed August 1, 1936.

Briefly and in its preferred aspect, the invention may include the following principal parts: First, a head or body portion having mounted therein at its lower portion one of the work contacting members in the form of a freely rotatable roller, and also supporting within an enclosed portion of the body portion opposed induction coils forming a part of the electro-magnetic gauging system; second, a vertically movable member having at its lower portion a freely rotatable roller disposed directly above the roller in the head;

third, a micrometer adjusting screw threaded within the vertically movable member for positioning the vertically movable member and its roller predetermined distances above the lower or fixed roller; fourth, a horizontally extending bar flexibly supported at an intermediate point and at one end contacting with the end of the micrometer screw and its other end being extended and disposed between the oppositely disposed induction coils; fifth, resilient means normally pressing the vertically movable member in a direction toward the lower or fixed roller; sixth, adjusting means to vary the pressure of the spring affecting the pressure of the movable member so that in all adjustments of the gauge the pressure will be substantially the same; and seventh, means to determine the setting of the gauging member.

Referring more in detail to the figures of the drawings, we provide a body member 10 which may be flexibly supported for substantially vertical movement upon links 11, there being three of these links pivotally attached to the head at one end by means of studs 12 outstanding from opposite sides of the head member. The opposite ends of these links 11 are pivotally attached to a supporting member 13 preferably in the form of a slide movable within a fixed mounting 14. As the means for supporting the gauging head 10 are substantially similar to the means shown in copending application of Spencer B. Terry No. 93,867, filed August 1, 1936, further description of this supporting means permitting vertical adjustment of the head 10 is not thought to be necessary.

Fixed in position within the head 10 as shown in Fig. 1 is a supporting member 15 supporting therein a vertically slidable member 16. The supporting member 15 is fastened in position against a vertical surface of the gauging head 10 by screws 17, one only of which is shown. At the lower end of the slidable member 16 is a freely rotatable work contacting roller 18 similar in every way to lower roller 19 also freely rotatable but mounted upon a fixed axis within the head 10. Rollers 18 and 19 are directly superposed one over the other and rotate on parallel axes. Preferably and as shown, the rollers may be hollow and have their opposed conical surfaces provided with openings to aid in dissipating the heat received from the material being gauged.

Within this slidable member 16 is secured a nut 20 within which is rotatably mounted a micrometer screw 21, the lower end of which contacts with a horizontally disposed armature member 22 presently to be more fully described. To facilitate sliding movement of member 16 bushings 23 of suitable bearing material are pressed into aligned openings within the supporting member 15 and having carefully finished holes through which the member 16 slides. Means not shown are provided retaining the member 16 against rotation.

The armature member 22 at one end is provided with a contacting button 24 directly engaging the lower end of the micrometer screw 21. The intermediate portion of this armature member 22 is supported for limited oscillatory movement upon a thin flexible strip of metal 25 such as spring steel. The opposite end of the armature of magnetic material such as steel extends substantially horizontally.

Disposed closely adjacent the upper and lower surfaces of the horizontally extending end of the armature 22 are oppositely positioned induction coils 26, these coils preferably being mounted as shown in a member 27 fixed in position within the head 10 and enclosed within an integral projecting part of the head. An adjustable screw 28 limits movement of the armature 22 in one direction and a light spring 29 on the opposite side of the armature normally presses the armature against the adjustable screw. The member 27 supporting the induction coils 26 within the head 10 may be insertable within its recess provided therein and bolted or otherwise secured in fixed position by its flange contacting with a face of the recess. To adjust the positions of the coils 26 toward or from each other and to adjust the screw 28 and spring 29 engaging the armature 22, threaded plugs 30 may be provided as shown. Connection to the coils 26 of the cables from the electric circuits of the indicating instrument (not shown) may be made through a watertight connecting member 31.

The spindle 21 of the micrometer screw at its upper end has a gear 32 directly secured thereto which is in mesh with gear teeth formed upon a vertically disposed shaft 33 so that by rotation of this shaft 33 the gear 32 is rotated and the micrometer screw 21 rotated therewith. In order to rotate this vertical shaft 33 there is provided at its upper end a knurled disk or ring 34 secured thereto which may be manually rotated. Also on this vertical shaft 33 is a bevel gear 35 meshing with a bevel gear 36 of a counter 37, the readings of which indicate the adjustments of the micrometer screw 21 and indicate in units such as a thousandth of an inch the exact adjustment or spacing of the adjustable gauging roller 18 above the fixed roller 19. Preferably and as shown, the counter 37 is mounted in position upon a horizontal plate 38 secured to the upper surface of the head 10 in any angular position. By means of one or more clamping screws 39 the plate 38 may be fixed in any angular position in its horizontal plane most convenient for the operator to read the setting of the counter and thus determine the setting of the gauge.

Also on this vertical shaft is a second series of gear teeth meshing with a gear 40, the hub 41 of which, formed separately from the gear, is threaded upon an intermediate portion of the vertically slidable member 16. The effect of rotation of the two gears 32 and 40 by rotation of the shaft 33 for adjusting the rollers 18 and 19 for a particular setting is to raise or lower this vertically slidable member 16 which also has its nut 20 threadedly engaging the micrometer screw 21. The threads of the micrometer screw 21 and those on the slidable member 16 have precisely the same lead and are of the same hand or direction, that is, both screw threads are or may be either right hand or left hand. The result, therefore, is that when the vertical shaft 33 is rotated the micrometer screw 21 moves upon its threads within the slidable member 16 a distance equal to and in the opposite direction from the movement imparted to the slidable member 16 by rotation of gear 40 and its threaded hub 41. The threads on the hub 41 of gear 40 upon which the slidable member 16 move are maintained in fixed axial position by the hub 41 bearing at all times against the end surface of the lower bearing member 23 so that rotation of this hub 41 by gear 40 raises or lowers the slidable member 16 and the work contacting roller 18 carried thereby. As the micrometer spindle 21 is threaded into the slidable member 16 and has threads of the same hand as those on which the slidable member 16 is threaded into the hub 41, the axial position of the micrometer spindle 21 is not affected in any way by adjustment of the slidable member 16 and its work contacting roller to different gauging positions.

Between the fixed abutment formed by the end surface of the lower bearing member 23 and the hub 41 of gear 40 which is threaded to the vertically slidable member 16 is a helically disposed compression spring 44 normally forcing the hub 41 and the slidable member 16 upward with a light but firm pressure. By the interposition of this spring and the ability of the member 41 and the slidable member 16 to move upward against the pressure of this spring no injury to or straining of the members can take place when the gauging rollers 18 and 19 are abnormally separated. Also the armature 22 is prevented from being strained as the separation of rollers only causes the micrometer screw 21 to move away from the armature 22.

Disposed between the hub 41 and an adjustable collar 46 is a helical spring 47 normally pressing the hub 41 and slidable member 16 downward. The pressure of this spring 47 may be adjusted by rotation of the collar 46 upon the threaded end of the upper bearing member 23. To lock the collar 46 in adjusted position a light wire 49 secured to the supporting member 15 has its free end bent upon itself and resiliently engaging within notches in the periphery of the collar 46. When adjusted the pressure of spring 47 downward is greater than the pressure of spring 44 upward so that the member 16 is held down as far as permitted by its adjustment by a light pressure.

Disposed about the lower portion of the vertically slidable member 16 is a flexible diaphragm 50 the outer periphery of which is secured to the supporting member 15 and housing the vertically slidable member 16 to which the inner periphery of the diaphragm is attached. The diaphragm may be of rubber or other thin flexible material so that the slidable member 16 may move freely. The space enclosed by this diaphragm 50 is protected against the entrance of steam, water or dust so that the operative parts of the mechanism are free to move without being adversely affected by water, etc., and the adjustability of the vertically slidable member 16 is in no way limited.

In operation the disk 34 is rotated until the counter 37 indicates the number of thousandths of an inch in the thickness desired in the material being gauged. This separates the rollers 18 and 19 by raising the roller 18 to the desired distance for the particular thickness of the material being rolled. With the rollers separated the gauge is ready for use when the head 10 is moved by its mounting 13 into position for its rollers 18 and 19 to contact the upper and lower surfaces of the work being gauged. As the work passes between the separated rollers 18 and 19 variations in thickness of the material will cause slight up and down movements of the roller 18 and the slidable member 16. This movement of the member 16 oscillates the armature 22 and thus causes variations in the induced currents in the coils 26. These variations in induced currents are used in a circuit and with an indicating instrument as shown in the above referred to copending application to indicate the variations in thickness of the material being rolled from the predetermined or nominal thickness for which the gauge is adjusted.

What we claim is:

1. A gauge comprising in combination, a head member, a work contacting member mounted thereon, a member slidably mounted in said head and having a work contacting member thereon, a rotatable member threaded to said slidable member to axially adjust said slidable member, a micrometer screw threaded within said slidable member, manual means to simultaneously rotate said rotatable member and micrometer screw, and means to indicate the adjustment of said slidable member.

2. A gauge comprising in combination, a head member, a work contacting member mounted thereon, a member slidably mounted in said head and having a work contacting member thereon, a rotatable member threaded to said slidable member to axially adjust said slidable member, a micrometer screw threaded within said slidable member, said threaded members having screw threads of the same lead and hand, manual means to simultaneously rotate said rotatable member and micrometer screw, and means to indicate the adjustment of said slidable member.

3. A gauge comprising in combination, a head member, a work contacting member mounted thereon, a member slidably mounted in said head and having a work contacting member thereon, a rotatable member resiliently retained in a fixed axial position during operation but permitted to move away from said position in one direction, said member being threaded to said slidable member to axially adjust said slidable member, a micrometer screw within said slidable member, manual means to simultaneously rotate said ring member and micrometer screw, and means to indicate the adjustment of said slidable member.

4. A gauge comprising in combination, a head member, a work contacting member mounted thereon, a member slidably mounted in said head and having a work contacting member thereon, a rotatable member threaded to said slidable member to axially adjust said slidable member, a micrometer screw within said slidable member, manual means to simultaneously rotate said rotatable member and micrometer screw to adjust said work contacting member on said slidable member for different thicknesses being gauged while maintaining said micrometer screw from axial movement, and means to indicate the adjustment of said slidable member.

5. A gauge comprising in combination, a head member, a work contacting member mounted thereon, a member slidably mounted in said head and having a work contacting member thereon, a rotatable member threaded to said slidable member to axially adjust said slidable member, a micrometer screw within said slidable member, and a manually rotatable shaft to simultaneously rotate said rotatable member and micrometer screw and actuate the indicator by which the setting of the work contacting members is determined.

6. A gauge comprising in combination, a head member, a work contacting member mounted thereon, a member slidably mounted in said head, a work contacting member thereon movable with said slidable member in a direction toward and from said first contacting member, a rotatable member threaded to said slidable member and normally spring pressed in one direction, a micrometer screw threaded axially through said slidable member, means to simultaneously rotate said rotatable member and micrometer screw to vary the adjustment of said slidable member and the contacting member carried thereby, means to indicate the adjustment of said slidable member, an armature contacting at one end with the end of said micrometer screw, and electrically operated means whereby variations in the axial position of said micrometer screw and slidable member during operation of the gauge may be determined.

7. A gauge comprising in combination, a head member, a work contacting member mounted thereon, a member slidably mounted in said head, a work contacting member thereon movable with said slidable member in a direction toward and from said first contacting member, a rotatable member threaded to said slidable member and normally spring pressed in a direction toward the first mentioned contacting member, a micrometer screw threaded axially through said slidable member, means to simultaneously rotate said rotatable member and micrometer screw to vary the adjustment of said slidable member and the contacting member carried thereby while said micrometer screw is maintained in fixed axial position, means actuated by rotation of said micrometer screw to indicate the adjustment of said slidable member, an armature contacting at one end with the end of said micrometer screw, and electromagnetic coils between which said armature operates to determine variations in axial position of said micrometer screw during operation of the gauge.

SPENCER B. TERRY.
RAYMOND S. FOX.